(12) United States Patent
Kang

(10) Patent No.: US 7,900,141 B2
(45) Date of Patent: Mar. 1, 2011

(54) ELECTRONIC TERMINAL HAVING SCREEN DIVISION DISPLAY FUNCTION AND SCREEN DISPLAY METHOD THEREOF

(75) Inventor: Rae-Hoon Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 1048 days.

(21) Appl. No.: 11/566,147

(22) Filed: Dec. 1, 2006

(65) Prior Publication Data

US 2007/0132720 A1    Jun. 14, 2007

(30) Foreign Application Priority Data

Dec. 9, 2005    (KR) .................. 10-2005-0120801

(51) Int. Cl.
*G06F 17/00* (2006.01)
(52) U.S. Cl. .................. 715/253; 715/249; 715/252; 715/244
(58) Field of Classification Search .................. None
See application file for complete search history.

(56) References Cited

U.S. PATENT DOCUMENTS

| | | | |
|---|---|---|---|
| 5,689,287 A | 11/1997 | Mackinlay | |
| 6,137,469 A | 10/2000 | Wu et al. | |
| 6,288,718 B1 * | 9/2001 | Laursen et al. | 715/800 |
| 6,850,689 B1 | 2/2005 | Ozawa et al. | |
| 2002/0109687 A1 | 8/2002 | Ishii et al. | |
| 2003/0214519 A1 * | 11/2003 | Smith et al. | 345/660 |
| 2004/0217979 A1 * | 11/2004 | Baar et al. | 345/660 |
| 2005/0044425 A1 * | 2/2005 | Hypponen | 713/202 |
| 2006/0064647 A1 * | 3/2006 | Tapuska et al. | 715/800 |
| 2006/0288280 A1 * | 12/2006 | Makela | 715/530 |
| 2007/0030256 A1 * | 2/2007 | Akaike et al. | 345/173 |

FOREIGN PATENT DOCUMENTS

| | | |
|---|---|---|
| EP | 0933694 A1 | 8/1999 |
| JP | 06-022200 | 1/1994 |
| JP | 7-181951 | 7/1995 |
| JP | 7334665 A | 12/1995 |
| JP | 11-266437 | 9/1999 |
| JP | 2000-057320 | 2/2000 |
| JP | 2002-215281 | 7/2002 |

(Continued)

*Primary Examiner*—Andrew Wang
*Assistant Examiner*—David H Chu
(74) *Attorney, Agent, or Firm*—Lee, Hong, Degerman, Kang & Waimey

(57) ABSTRACT

The present invention provides an electronic terminal having a screen division display function, the terminal including a memory for storing at least one document file and a viewer program for opening and showing the contents of the document file; and a control unit for executing the viewer program to divide a page of the document file stored in the memory into a plurality of cell, display one of the divided cells in one area of a screen window and display one or more cells adjacent to the cell displayed in the one area of the screen window in other areas of the screen window. According to the present invention, movement among the divided cells can be easily implemented using the direction keys provided on the electronic terminal such that the number of movements of a cursor required for displaying the entire document can be drastically decreased even when a document is enlarged such that it may be recognized with the naked eye.

23 Claims, 6 Drawing Sheets

FOREIGN PATENT DOCUMENTS

| | | |
|---|---|---|
| JP | 2002-281285 | 9/2002 |
| JP | 2003-173232 | 6/2003 |
| JP | 2004-534960 | 11/2004 |
| JP | 2005-004024 | 1/2005 |
| JP | 2005-020209 | 1/2005 |
| KR | 10-2004-0036466 | 4/2004 |
| KR | 10-2004-0040743 | 5/2004 |
| KR | 10-2005-0082789 | 8/2005 |
| KR | 10-2005-0121528 | 12/2005 |
| KR | 10-2006-0065218 | 6/2006 |
| KR | 10-2006-0088579 | 8/2006 |

* cited by examiner

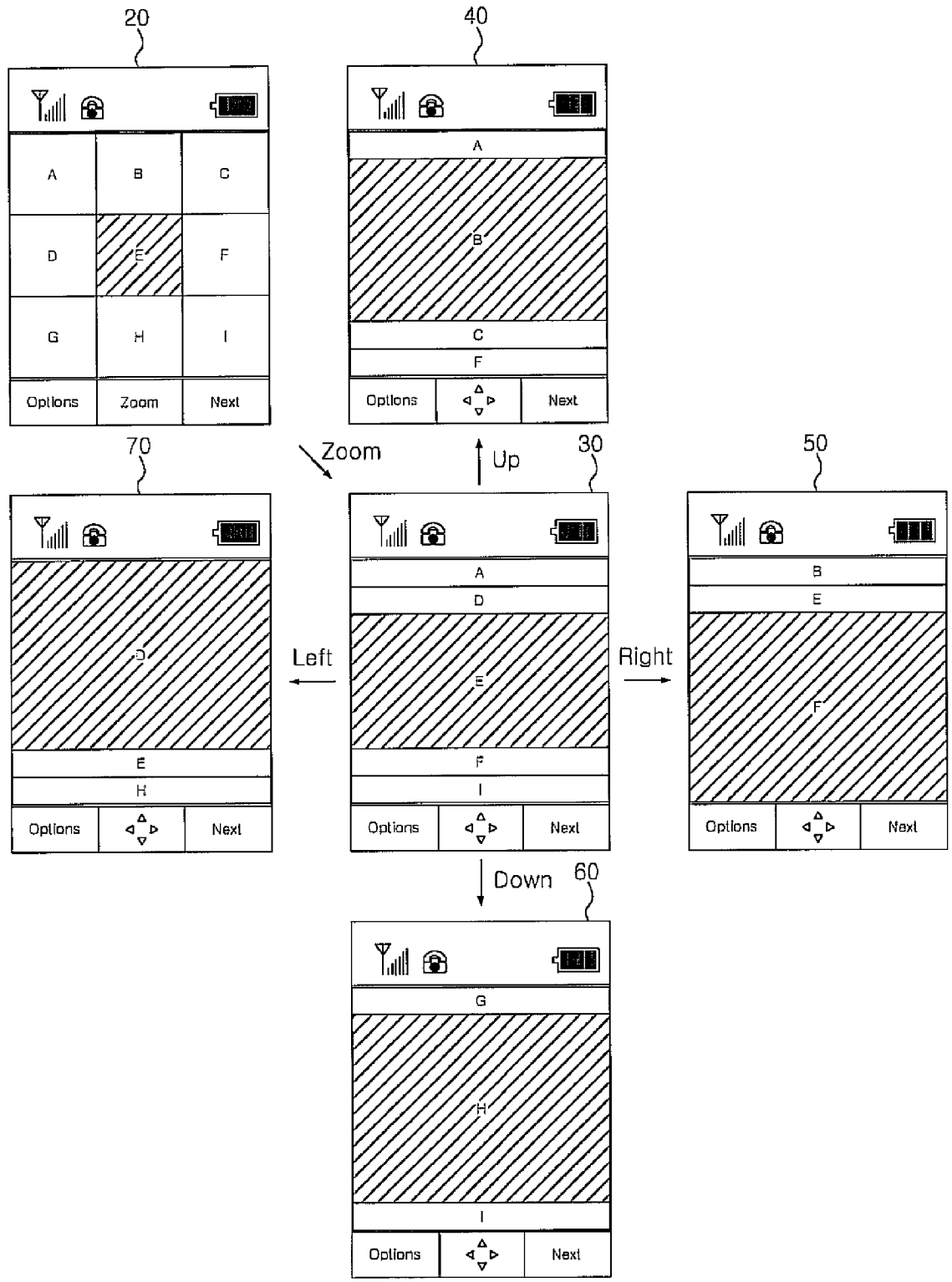

ELECTRONIC TERMINAL HAVING SCREEN DIVISION DISPLAY FUNCTION AND SCREEN DISPLAY METHOD THEREOF

CROSS-REFERENCE TO RELATED APPLICATIONS

Pursuant to 35 U.S.C. §119(a), this application claims the benefit of earlier filing date and right of priority to Korean Application No. 10-2005-0120801, filed Dec. 9, 2005, the contents of which are hereby incorporated by reference herein in their entirety.

FIELD OF THE INVENTION

The present invention is directed to a screen display of an electronic terminal, and more specifically, to an electronic terminal having a screen division display function and a screen display method thereof, wherein when a user opens and views the contents of a variety of document files on an electronic terminal, such as a mobile communication terminal, button manipulations are minimized when viewing the entire contents of a document file in an enlarged state such that they may be recognized with the naked eye.

DESCRIPTION OF THE RELATED ART

Mobile communication has developed rapidly and mobile communication terminals now include cellular phones, PCS phones and GSM terminals. As mobile communication fields have diversified and mobile communication terminals have increased in popularity, a variety of additional services, such as a camera function, a MP3 playback function, a DMB watch function and a document display function, have been implemented.

When a user views a document downloaded from a personal computer (PC) using a conventional mobile communication terminal, characters displayed on the screen are frequently difficult to read due to a small screen size. Accordingly, a process of pressing a direction key or manipulating scroll bars using a mouse or a touch screen must be performed in order to enlarge a portion of the contents of a document file when using a conventional mobile communication terminal.

Therefore, conventional mobile communication terminals have a disadvantage in that many cursor movements are required in order to shift a screen and view the contents of a document file by pressing a direction key when the contents are enlarged. For example, when a user has viewed a line from the left to the right, many clicks are required on a direction key in order to shift the screen from the right to the left.

SUMMARY OF THE INVENTION

An object of the present invention to minimize the number of button manipulations required for viewing the entire contents of a document file in an enlarged state such that the contents may be recognized with the naked eye when a user opens and views a variety of document files on an electronic terminal, such as a mobile communication terminal.

In one aspect of the present invention, an electronic terminal having a screen division display function is provided. The terminal includes a memory adapted to store at least one document file and a control unit adapted to select the contents of the at least one document file, divide a selected page of the at least one document file into a plurality of cells, display a first of the plurality of cells in a first area of a screen window and display at least a second of the plurality of cells adjacent to the first of the plurality of cells in a second area of the screen window.

It is contemplated that the control unit includes a division processing unit adapted to divide the selected page of the at least one document file into the plurality of cells, a screen allocation processing unit adapted to allocate the first of the plurality of cells to the first area of the screen window and to allocate the at least second of the plurality of cells to the second area of the screen window and a screen display processing unit adapted to display the first of the plurality of cells in the allocated first area of the screen window and display the at least second of the plurality of cells in the allocated second area of the screen window. It is further contemplated that the screen allocation processing unit is further adapted to display at least a portion of the contents of the at least second of the plurality of cells in an overlay manner.

It is contemplated that the screen allocation processing unit is further adapted to entirely display the selected page of the at least one document file on the screen window, the page including the plurality of cells. It is further contemplated that the screen allocation processing unit is further adapted to display the first of the plurality of cells in at least one of an enlarged state and a highlighted state in comparison to the at least second of the plurality of cells.

It is contemplated that the allocated second area is adjacent to the allocated first area and the screen allocation processing unit is further adapted to display the contents of the first of the plurality of cells in a first size and display at least a portion of the contents of the at least second of the plurality of cells in a second size smaller than the first size. It is further contemplated that the screen display processing unit is further adapted to display a thumbnail window in a predetermined area of the screen window, the thumbnail window indicating which of the plurality of cells including the page is the first of the plurality of cells displayed in the allocated first area of the screen window.

It is contemplated that the screen display processing unit is further adapted to display a translucent location information window on the screen window in an overlay manner, the translucent location information window indicating which of the plurality of cells including the page is the first of the plurality of cells displayed in the allocated first area of the screen window. It is further contemplated that the terminal further includes a key input unit having a plurality of keys arranged in one-to-one correspondence with the plurality of cells including the page and the control unit is further adapted to indicate a location of the first of the plurality of cells displayed in the allocated first area of the screen window by illuminating of one of the plurality of keys.

It is contemplated that the terminal further includes a key input unit having a plurality of keys arranged in one-to-one correspondence with the plurality of cells including the page and the control unit is further adapted to select the first of the plurality of cells according to selection of one of the plurality of keys. It is further contemplated that the at least second of the plurality of cells is adjacent to the first of the plurality of cells in one of a left, right, upper left diagonal and lower right diagonal direction.

It is contemplated that the terminal further includes a key input unit having a direction key and the control unit is further adapted to select the first of the plurality of cells according to movement of the direction key. It is further contemplated that the terminal further includes a key input unit having a function key and the control unit is further adapted to select the first of the plurality of cells according to a function set by the function key.

In another aspect of the present invention, a method for displaying a document on a screen window of an electronic terminal is provided. The method includes selecting the contents of a document file for display, the contents selected from among at least one stored document file, dividing a page of the at least one document file into a plurality of cells, displaying a first of the plurality of cells in an allocated first area of the screen window and displaying at least a second cell of the plurality of cells adjacent to the first of the plurality of cells in an allocated second area of the screen window.

It is contemplated that displaying the at least second of the plurality of cells includes displaying at least a portion of the contents of the at least second of the plurality off cells in an overlay manner. It is further contemplated that the method further includes entirely displaying the page of the at least one document file on the screen window.

It is contemplated that displaying the first of the plurality of cells includes displaying the first of the plurality of cells in at least one of an enlarged state and a highlighted state in comparison to the at least second of the plurality of cells. It is further contemplated that the allocated second area is adjacent to the allocated first area and displaying the first of the plurality of cells includes displaying the contents of the first of the plurality of cells in a first size and displaying the at least second of the plurality of cells includes displaying at least a portion of the contents of the at least second of the plurality of cells in a second size smaller than the first size.

It is contemplated that the method further includes displaying a thumbnail window in a predetermined area of the screen window, the thumbnail window indicating which of the plurality of cells is the first of the plurality of cells displayed in the allocated first area of the screen window. It is further contemplated that the method further includes displaying a translucent location information window on the screen window in an overlay manner, the translucent location information window indicating which of the plurality of cells is the first of the plurality of cells displayed in the allocated first area of the screen window.

It is contemplated that the method further includes indicating a location of the first of the plurality of cells displayed in the allocated first area of the screen window by illuminating one of a plurality of keys on a key input unit. It is further contemplated that the method further includes selecting the first of the plurality of cells according to selection of one of a plurality of keys on a key input unit.

It is contemplated that the at least second of the plurality of cells is a cell adjacent to the first of the plurality of cells in one of a left, right, upper left diagonal and lower right diagonal direction. It is further contemplated that the method further includes selecting the first of the plurality of cells according to movement of a direction key on a key input unit. Preferably, the method further includes selecting the first of the plurality of cells according to a function set by a function key on a key input unit.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

FIG. 7 illustrates screens according to the screen display method in a mobile communication terminal according to an embodiment of the present invention.

DETAILED DESCRIPTION OF THE PREFERRED EMBODIMENTS

Figure 1:
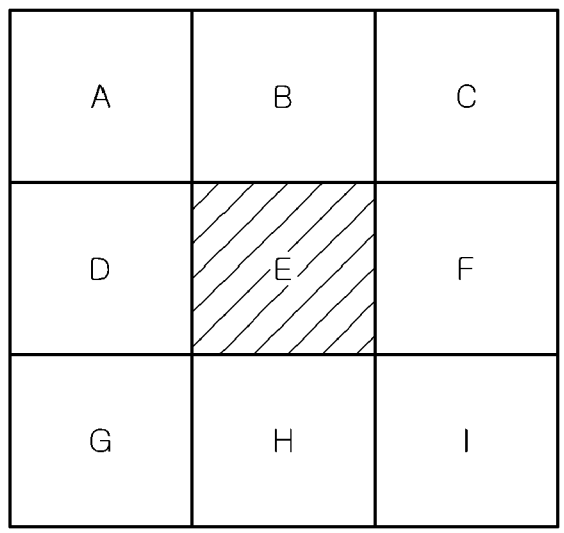
FIG. 1 illustrates a screen division display principle for executing a screen division display function in a mobile communication terminal according to an embodiment of the present invention.

Embodiments of the present invention will be described in greater detail with reference to the accompanying drawings. FIG. 1 illustrates a screen division display principle for executing a screen division display function in a mobile communication terminal according to an embodiment of the present invention.

As illustrated in FIG. 1, a certain page of a document file stored in the mobile communication terminal is entirely displayed on a screen window. As illustrated, one page is divided into nine cells in a 3×3 matrix.

Accordingly, a page of a document comprises cells A, B, C, D, E, F, G, H and I. However, characters contained on a page of the document are too small to be recognized with the naked eye since a page of a document is entirely displayed on one screen window.

Divided cells A to I can each be enlarged and displayed on one screen window. According to the present invention, each of the cells may be enlarged and displayed in one screen window such that the characters in the cell have sufficient size to be recognized with the naked eye.

Figure 2:
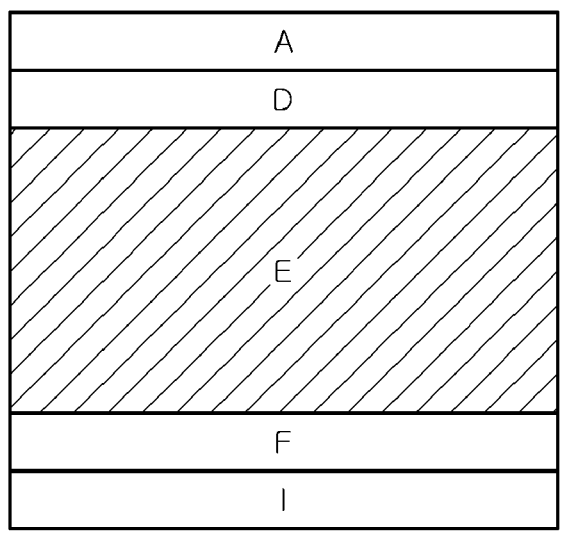
FIG. 2 illustrates one of the cells illustrated in FIG. 1 enlarged and displayed on a screen window.

FIG. 2 illustrates cell E in FIG. 1 enlarged and displayed in a screen window. With cell E enlarged and displayed on one screen window, a user can read the contents contained in cell E.

When cell E is enlarged and displayed on the screen window, not only cell E but also adjacent cells are displayed together on the screen window in consideration of a general reading style of the user. If the cells adjacent to cell E are displayed together with cell E, a user who reads the contents of cell E can also know the contents contained in the cells adjacent to cell E.

However, since a user desires to view the contents of cell E, the contents of cell E are enlarged and displayed in a large scale. The cells adjacent to cell E are displayed in areas much smaller than that of cell E.

As illustrated, in FIG. 2, cell D, which is adjacent to the left side of cell E, is displayed close to and above cell E and cell F, which is adjacent to the right side of cell E, is displayed close to and below cell E. Furthermore, cell A, which is adjacent to cell E in the upper left diagonal direction, is displayed in a second area above cell E, whereas cell I, which is adjacent to cell E in the lower right diagonal direction, is displayed in a second area below cell E.

Figure 3:
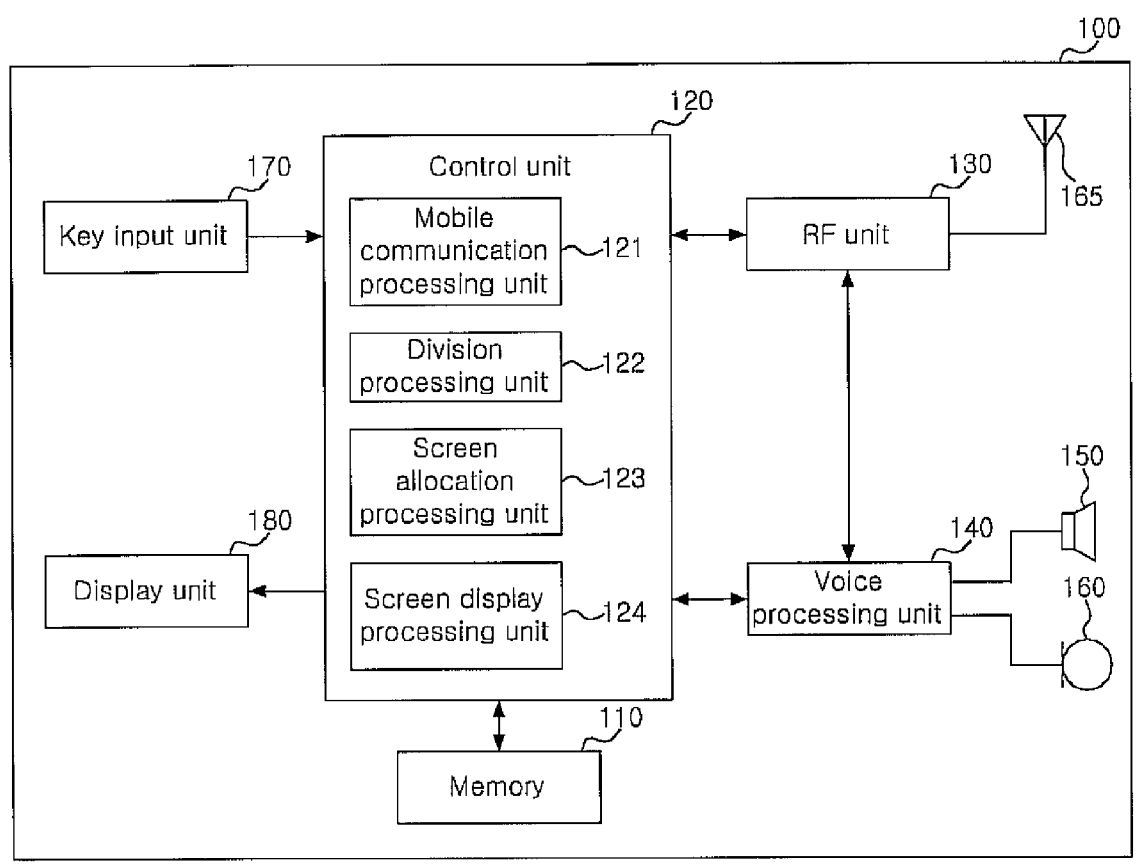
FIG. 3 is a block diagram of a mobile communication terminal having a screen division display function according to an embodiment of the present invention.

FIG. 3 is a block diagram of a mobile communication terminal 100 having a screen division display function according to an embodiment of the present invention. As illustrated in FIG. 3, the mobile communication terminal 100 includes a memory 110 for storing a document to be displayed on a screen window; a control unit 120 for dividing a page selected from the document stored in the memory into a plurality of cells, displaying the cells on the screen window, and enlarging and displaying a selected cell in a predetermined area of the screen window; a radio frequency (RF) unit 130; a voice processing unit 140; a speaker 150; a microphone 160; a key input unit 170; and a display unit 180 for providing a screen window, The memory 110 stores a variety of document files and a viewer program for opening a document file and displaying the contents of the corresponding document file on the screen window. When a certain page of a document is divided into a plurality of cells by executing the viewer program, the memory 110 temporarily stores the divided cells in order to display them on the screen window.

The viewer program is a program that is executed by the control unit 120 to display the contents of a variety of documents stored in the memory 110 on the screen window such that a page is divided into a plurality of cells with a certain cell and other adjacent cells displayed in predetermined areas on the screen window. When a certain cell of the divided cells is selected for display at the center of the screen window, the memory 110 temporarily stores data for enlarging and displaying the corresponding cell at the center of the screen window. As used herein, a 'main cell' refers to a cell selected from among the divided cells for display in an area, such as the center of the screen window.

The memory 110 also temporarily stores data for displaying cells adjacent to a cell at the center of the screen window in surrounding areas adjacent to the display area at the center of the screen window. As used herein, an 'adjacent cell' refers to a cell adjacent to a cell selected from among the divided cells for display in an area of the screen window.

The memory 110 includes a ROM for storing operating programs, an electrically programmable EEPROM and a RAM.

The control unit 120 controls general operations of the mobile communication terminal. The control unit 120 also executes the viewer program stored in the memory 110 in order to display the contents of a variety of document files stored in the memory on the screen window of the display unit 180 through screen division display processing. The control unit 120 includes a mobile communication processing unit 121, a division processing unit 122, a screen allocation processing unit 123, and a screen display processing unit 124.

The mobile communication processing unit 121 is a module for processing mobile communication services in the mobile communication terminal 100 utilizing wireless resources and is configured and operated using well known mobile communication techniques. Thus, a detailed description of the mobile communication processing unit 121 will be omitted.

The division processing unit 122 divides a certain page of a document file selected from among document files stored in the memory 110 into a plurality of predetermined cells and temporarily stores the cells in the memory. The screen allocation processing unit 123 allocates a plurality of the cells for display on the screen window.

Figure 4:
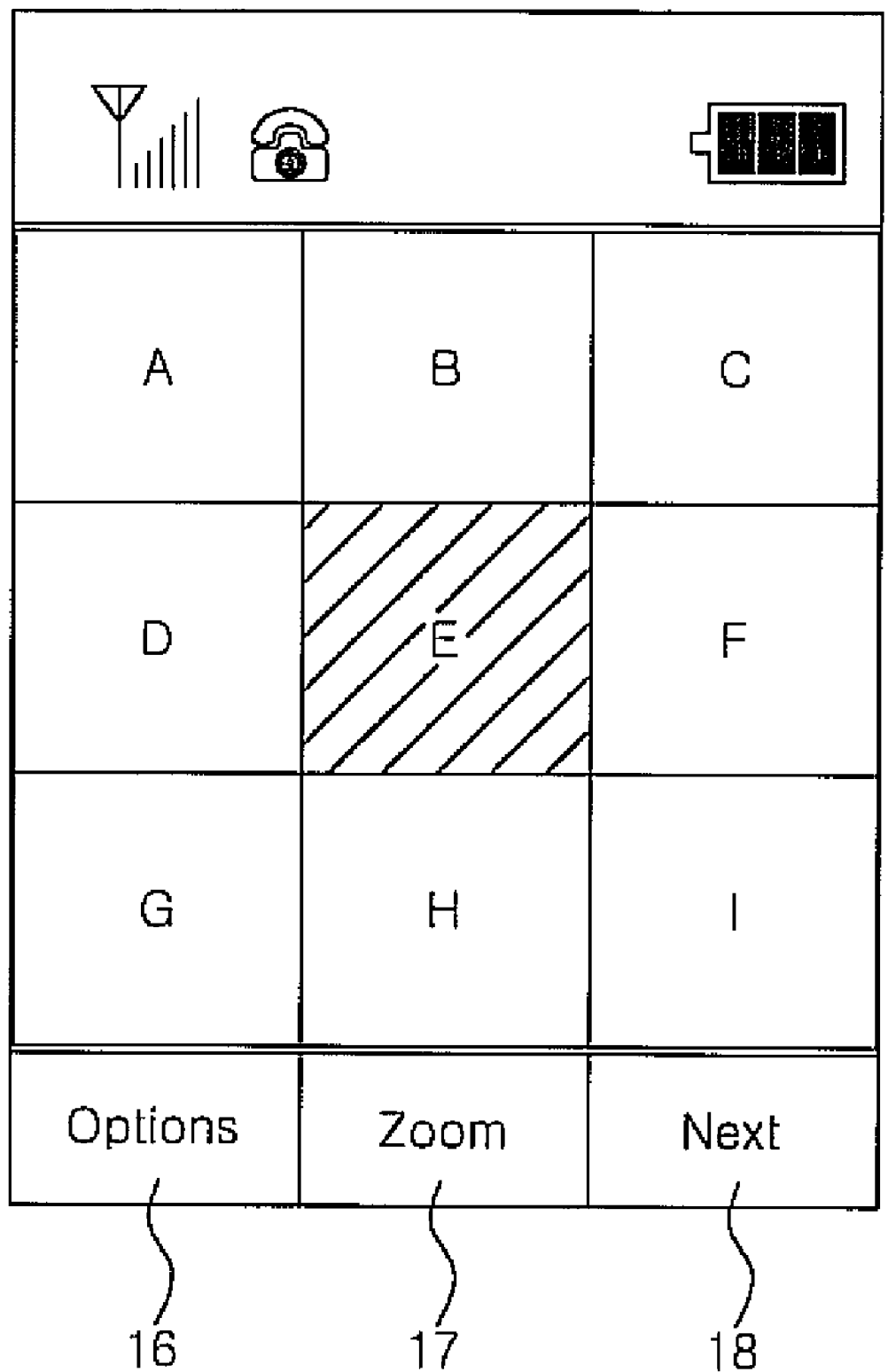
FIG. 4 illustrates a screen displayed when an entire screen display function is executed in a mobile communication terminal according to an embodiment of the present invention.

The screen allocation processing unit 123 performs screen allocation so that entire cells constituting a page can be displayed on the screen window, as illustrated in FIG. 4. Alternately, the screen allocation unit 123 may cause only specific cells selected from among the plurality of cells constituting a page to be displayed on the screen window, as illustrated in FIG. 5.

Figure 5:
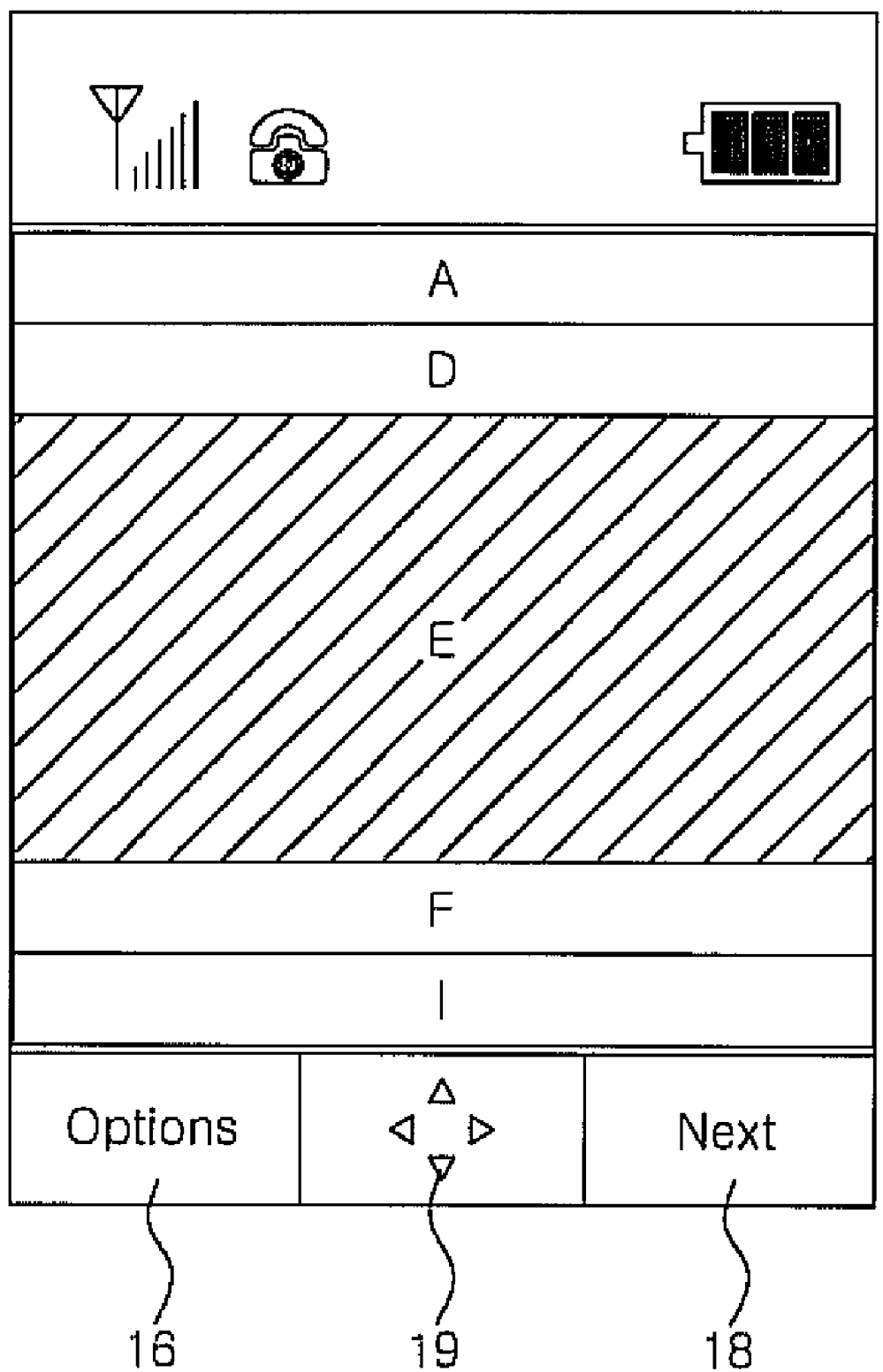
FIG. 5 illustrates a screen displayed when an enlargement display function is executed in a mobile communication terminal according to an embodiment of the present invention.

Soft keys illustrated in FIGS. 4 and 5 include an 'option' key 16, a 'zoom key' 17, a 'next' key 18, and a 'direction' key 19. The soft keys are displayed on the screen window of the display unit 180 and are allocated such that they correspond to hard keys provided on the key input unit 170. Accordingly, a user can perform operations by manipulating the hard keys provided on the key input unit 170, which correspond to the soft keys, while referring to the soft keys.

For example, the 'option' key 16 is a key for executing a variety of services of the mobile communication terminal, the 'zoom' key 17 is a key for executing an enlargement display function while an entire screen display function is performed, the 'next' key 18 is a key for switching a page to a next page when a document includes a plurality of pages, and the 'direction' key 19 is a key for selecting a cell for display on the screen window from among a plurality of cells. Accordingly, a user can select a cell that he/she desires to view from among divided cells by manipulating a 'direction' key of the key input unit 170 corresponding to the 'direction' key 19 in order to display the selected cell on the display unit 180 when the enlargement display function is executed.

When a cell to be displayed as a main cell is selected from among the divided cells according to a user's manipulation, the screen allocation processing unit 123 designates the selected cell as the main cell and selects adjacent cells close to the main cell. A variety of forms can be applied to a method of allocating and displaying adjacent cells around the main cell.

For example, the main cell may be allocated in a predetermined size at the center of the screen window. A cell adjacent to the left side of the main cell may then be displayed in a small size above the allocated main cell displayed at the center of the screen window and a cell adjacent to the right side of the main cell may then be displayed in a small size below the allocated main cell.

Furthermore, by taking into consideration a reading style of a user, other cells may be displayed in addition to the cells adjacent to the left and right sides of the main cell. A cell adjacent to the main cell in the upper left diagonal direction may be allocated and displayed above the area where the cell adjacent to the left side of the main cell is allocated and displayed. A cell adjacent to the main cell in the lower right diagonal direction may be allocated and displayed below the area where the cell adjacent to the right side of the main cell is allocated and displayed.

As illustrated in FIG. 5, the cells are allocated and displayed in order of the upper left diagonal adjacent cell A, the left adjacent cell D, the main cell E, the right adjacent cell F, and the lower right diagonal adjacent cell I from the top. If an arbitrary main cell is selected and a certain cell among the upper left diagonal adjacent cell, the left adjacent cell, the right adjacent cell, and the lower right diagonal adjacent cell does not exist with respect to the main cell when the screen allocation processing unit 123 allocates the screen window, the non-existing cell is not allocated and the screen window is configured with only existing cells. Therefore, the main cell is allocated to have a larger size.

The screen display processing unit 124 displays all the divided cells constituting a page of a document, as illustrated in FIG. 4. On the other hand, the screen display processing unit 124 may, as illustrated in FIG. 5, enlarge a cell selected according to a user's manipulation such that the selected cell is displayed at the center of the screen window as the main cell among the cells divided by the division processing unit 122 according to the cell allocation operation of the screen allocation processing unit 123.

The screen display processing unit 124 displays adjacent cells selected by the screen allocation processing unit 123 above and below the main cell, respectively, In addition to displaying the main cell at the center of the screen window. As illustrated in FIG. 5, the screen display processing unit 124 displays the adjacent cells A, D, F and I in a size much smaller than that of main cell E.

Furthermore, the contents of the adjacent cells A, D, F and I are displayed such that all the contents of those cells are displayed in a reduced size. Moreover, only a selected portion of the contents of a corresponding adjacent cell may be displayed, such as only a front or rear portion. Accordingly, the contents of one or two lines of the entire contents of an adjacent cell may be displayed.

When only a selected portion of the entire contents of a corresponding adjacent cell is displayed it is possible to use a character font identical to, or slightly smaller than, that used for displaying the contents of the main cell. Therefore, a user can easily recognize the contents of an adjacent cell with the naked eye and can also read a limited portion of the adjacent cell that follows the contents of the main cell.

Furthermore, the screen allocation processing unit 123 can perform screen allocation such that if a certain adjacent cell is selected from among the adjacent cells displayed on the screen window together with the main cell, the entire contents or only a selected portion of the contents of the corresponding adjacent cell is displayed on the screen window in an overlay manner using a pop-up function. A pop-up window overlaid on the screen window may be opaque or translucent.

Accordingly, if a user selects an adjacent cell displayed on the screen window by manipulating the key input unit 170, the entire contents or a previously selected portion of the contents of the corresponding cell may be temporarily displayed when the main cell is displayed in an enlarged state. The screen display processing unit 124 temporarily stores data for displaying the main cell and adjacent cells, which are selected by the screen allocation processing unit 122, in predetermined areas in the memory. Since a cell selected as the main cell varies according to a user's choice, data for enlarging and displaying the cell selected as the main cell by the screen allocation processing unit 122 and data for displaying cells selected as the adjacent cells around the enlarged displayed main cell are temporarily stored in the memory 110.

The control unit 120 controls the RF unit 130. The RF unit 130 performs band-down-conversion and outputs data to the control unit 120 or the voice processing unit 140 according to a type of data when it receives frequency signals via a wireless channel in a frequency band through an antenna 165. The RF unit 130 also performs band-up-conversion in order to transmit data received from the control unit 120 or encoded voice data received from the voice processing unit 140, converts the data into wireless signals in a frequency band and outputs the signals through the antenna 165.

Data output from the RF unit 130 to the control unit 120 are character data, paging signals, or signaling signals received through a paging channel. Data output to the voice processing unit 140 are voice data received when a voice call is established.

The voice processing unit 140 generally includes a vocoder and is driven under the control of the control unit 120. The voice processing unit 140 modulates electrical signals received from the microphone 60 into voice data and outputs the voice data to the RF unit 130. The voice processing unit 140 also demodulates encoded voice data received from the RF unit 130 into electrical signals and outputs the signals to the speaker 150. The speaker 150 converts the electrical signals into audible sound and outputs the sound.

The key input unit 170 is generally configured in a key matrix structure. The key input unit 170 includes a plurality of numeric keys, function keys for performing a variety of functions and direction keys. The key input unit 170 outputs electrical signals corresponding to key data to the control unit 120 in response to a user's key input.

The display unit 180 provides the screen window for displaying the cells created by dividing each page of a document stored in the memory 110. The display unit 180 also displays the current state of the mobile communication terminal or changes in the progressive state of a program. The display input unit 180 can be configured using a display device, such as a liquid crystal display (LCD).

Figure 6:
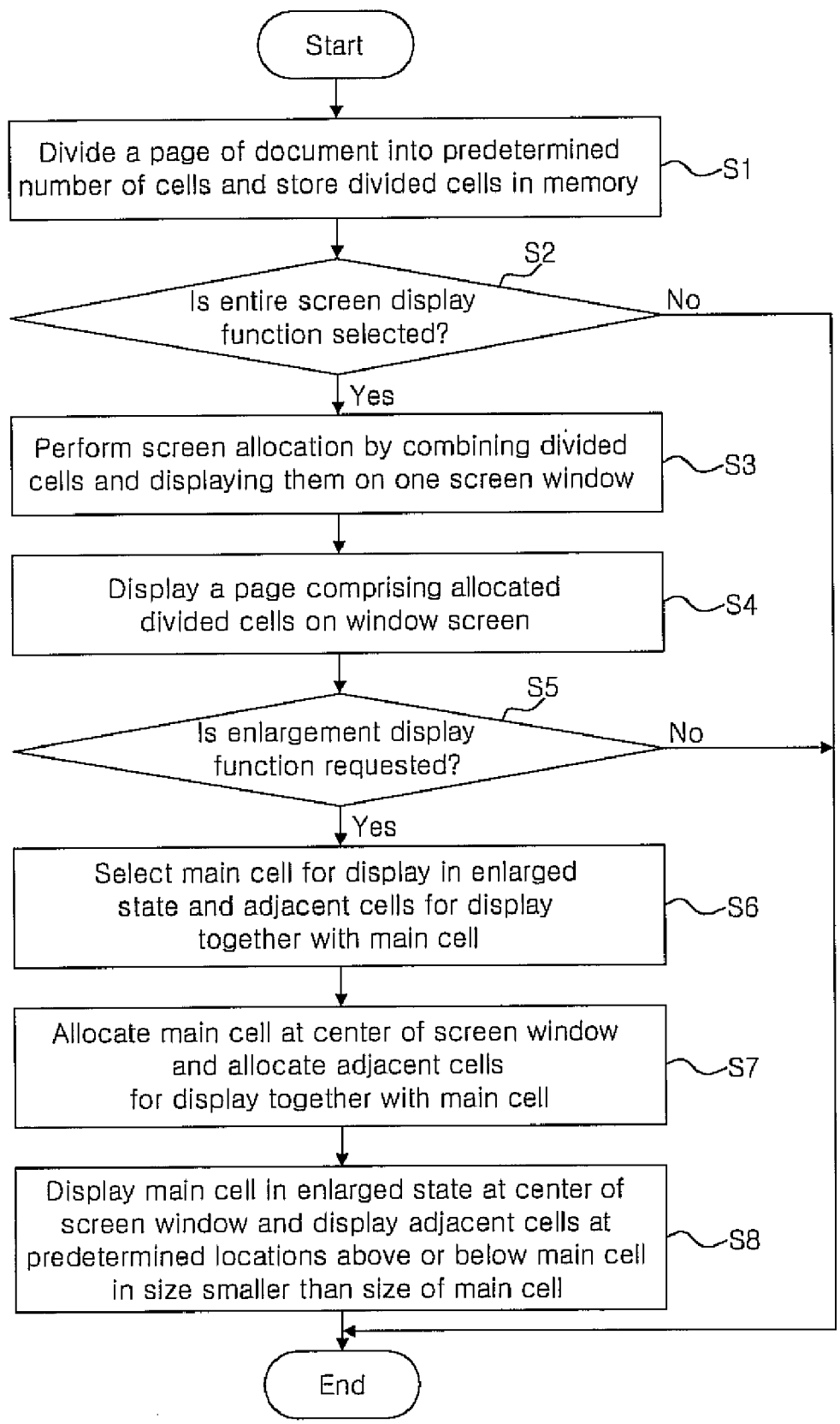
FIG. 6 is a flowchart of a screen display method in a mobile communication terminal according to an embodiment of the present invention.

FIG. 6 is a flowchart illustrating a screen display method in a mobile communication terminal having a screen division display function according to an embodiment of the present invention. As illustrated in FIG. 6, when there is a screen division display request for a certain page of a document file selected through the key input unit 170, the division processing unit 122 of the control unit 120 divides the corresponding page of the document file stored in the memory 110 into a predetermined number of cells. For example, the division processing unit 122 may divide the corresponding page into nine cells and store the cells in the memory (step S1).

When the division processing unit 122 creates cells corresponding to pages of a document and stores the cells in the memory 110, the screen allocation processing unit 123 determines whether a user has selected an entire screen display function via the key input unit 170 (step S2). If it is determined that the entire screen display function is selected, the screen allocation processing unit 123 performs screen allocation by combining the divided cells stored in the memory 110 and displaying the cells on one screen window (step S3). When the screen allocation processing unit 123 performs screen allocation to execute the entire screen display function, the screen display processing unit 124 displays a page including the divided cells allocated by the screen allocation processing unit on the screen window (step S4).

The screen allocation processing unit 123 determines whether an enlargement display function is requested for an arbitrary cell when the entire screen display function is performed by the screen display processing unit 124 (step S5). If it is determined that the enlargement display function is requested for an arbitrary cell, the screen allocation processing unit 123 selects adjacent cells for display together with a cell selected for display in an enlarged state when the enlargement display function is performed (step S6).

The screen allocation processing unit 123 performs screen allocation such that the cell selected for display in an enlarged state is designated as the main cell and then allocated at the center of the screen window with adjacent cells displayed together with the main cell in predetermined areas on the screen display window (step S7). For example, the adjacent cells may be displayed in upper or lower areas on the screen window where the main cell is displayed.

When the screen allocation processing unit 123 performs screen allocation for the enlargement display function, the screen display processing unit 124 enlarges and displays the main cell at the center of the screen window (step S8). The screen allocating processing unit 123 also displays the adjacent cells in predetermined areas above or below the area where the main cell is displayed and in a predetermined size smaller than the size of the main cell (step S8).

FIG. 7 illustrates screens according to the screen display method in a mobile communication terminal having a screen division display function according to an embodiment of the present invention. As illustrated in FIG. 7, the screen display processing unit 124 displays a first screen 20 including a plurality of divided cells on the screen window of the display unit 180 if the entire screen display function is selected by manipulating the key input unit 170.

If the enlargement display function is executed when a cursor is placed on cell E in the first screen 20, a second screen 30 is displayed on the screen window of the display unit 180 with cell E enlarged as the main cell. As illustrated in the second screen 30, cell E is displayed in an enlarged state at the center of the screen window.

Cell D, which is adjacent to the left side of cell E in first screen 20, cell A, which is adjacent to cell E in the upper left diagonal direction in first screen 20, are displayed above cell E in this order. Additionally, cell F, which is adjacent to the right side of cell E in first screen 20, and cell I, which is adjacent to cell E in the lower right diagonal direction in first screen 20, are displayed below cell E in this order. As can be seen, cell E is the main cell displayed at the center of the screen window in a larger area, with adjacent cells A, D, F and I displayed in a size much smaller than the size of cell E.

If an up key is selected using the direction key provided on the key input unit 170 when the second screen 30 is displayed on the screen window of the display unit 180, a third screen 40 is displayed on the screen window of the display unit 180. As illustrated in the third screen 40, cell B, which is positioned above cell E in the first screen 20, is displayed in an enlarged state at the center of the screen window and cell A, which is adjacent to the left side of cell B in the first screen, is displayed above cell B. Additionally, cell C, which is adjacent to the right side of cell B in the first screen 20, and cell F, which is adjacent to cell B in the lower right diagonal direction in the first screen, are displayed below cell B in this order.

As can be seen from a comparison of the third screen 40 and the second screen 30, two adjacent cells A and D are displayed above the main cell in the second screen 30, whereas only one adjacent cell A is displayed above the main cell in the third screen 40. This is because the first screen 20 displays all the left and right adjacent cells, upper left diagonal adjacent cell and lower right diagonal adjacent cell with respect to cell E, whereas only the left and right adjacent cells and lower right diagonal adjacent cell are displayed and the upper left diagonal adjacent cell are not displayed with respect to cell B.

Therefore, there is no particular need for displaying a non-existing cell in the third screen 40 and the corresponding surplus area is allocated for cell B, which is the main cell. It can be seen that cell B, which is the main cell, is displayed at the center of the screen window in a large area in the third screen 40, whereas adjacent cells A, C and F are displayed in areas much smaller than that of cell B.

If a right direction key is selected using the direction key provided on the key input unit 170 when the second screen 30 is displayed on the screen window of the display unit 180, a fourth screen 50 is displayed on the screen window of the display unit. As illustrated in the fourth screen 50, cell F, which is positioned at the right side of cell E in the first screen 20, is displayed in an enlarged scale at the center of the screen window and cell E, which is adjacent to the left side of cell F in the first screen, and cell B, which is adjacent to cell F in the upper left diagonal direction in the first screen, are displayed above cell F in this order. However, there is no cell displayed below cell F in the fourth screen 50.

As can be seen from a comparison of the fourth screen 50 and the second screen 30, two adjacent cells F and I are displayed below the main cell in the second screen 30, whereas no cell is displayed below the main cell in the fourth screen 50. This is because, the first screen 20 displays all the left and right adjacent cells, upper left diagonal adjacent cell, and lower right diagonal adjacent cell with respect to cell E, whereas only the left adjacent cell and upper left diagonal adjacent cell are displayed and the right adjacent cell and lower right diagonal adjacent cell are not displayed with respect to cell F.

Therefore, there is no particular need for displaying non-existing cells in the fourth screen 50 and the corresponding surplus area is allocated for cell F, which is the main cell. It can be seen that cell F, which is the main cell, is displayed at the center of the screen window in a large area in the fourth screen 50, whereas cells B and E, which are adjacent cells, are displayed in areas much smaller than that of cell F.

If a down key is selected using the direction key provided on the key input unit 170 when the second screen 30 is displayed on the screen window of the display unit 180, a fifth screen 60 is displayed on the screen window of the display unit. As illustrated in the fifth screen 60, cell H, which is positioned below cell E in the first screen 20, is displayed in an enlarged scale at the center of the screen window and cell G, which is adjacent to the left side of cell H in the first screen, is displayed above cell H. Additionally, cell 1, which is adjacent to the right side of cell H in the first screen 20, is displayed below cell H.

As can be seen from a comparison of the fifth screen 60 and the second screen 30, the adjacent cells A and D are displayed above the main cell and two adjacent cells F and I are displayed below the main cell in the second screen 30, whereas only one adjacent cell G is displayed above the main cell and only one adjacent cell I is displayed below the main cell in the fifth screen 60. This is because the first screen 20 displays all the left and right adjacent cells, upper left diagonal adjacent cell, and lower right diagonal adjacent cell with respect to cell E, whereas only the left and right adjacent cells are displayed and the upper left diagonal adjacent cell and lower right diagonal adjacent cell are not displayed with respect to cell H.

Therefore, there is no particular need for displaying non-existing cells in the fifth screen 60 and the corresponding surplus area is allocated for cell H, which is the main cell. It can be seen that cell H, which is the main cell, is displayed at the center of the screen window in a large area in the fifth screen 60, whereas adjacent cells G and I are displayed in areas much smaller than that of cell H.

If a left direction key is selected using the direction key provided on the key input unit 170 when the second screen 30 is displayed on the screen window of the display unit 180, a sixth screen 70 is displayed on the screen window of the display unit. As illustrated in the sixth screen 70, cell D, which is positioned at the left side of cell E in the first screen 20, is displayed in an enlarged state at the center of the screen window and cell E, which is adjacent to the right side of cell D in the first screen, and cell H, which is adjacent to cell D in the lower right diagonal direction in the first screen, are displayed below cell D in this order. However, there is no cell displayed above cell D in the sixth screen 70.

As can be seen from a comparison of the sixth screen 70 and the second screen 30, two adjacent cells A and D are displayed above the main cell in the second screen 30, whereas no cell is displayed above the main cell in the sixth screen 70. This is because the first screen 20 displays all the left and right adjacent cells, upper left diagonal adjacent cell, and lower right diagonal adjacent cell with respect to cell E, whereas only the right adjacent cell and lower right diagonal adjacent cell are displayed and the left adjacent cell and upper left diagonal adjacent cell are not displayed with respect to cell D.

Therefore there is no particular need for displaying nonexistent cells in the sixth screen 70 and the corresponding surplus area is allocated for cell D, which is the main cell. It can be seen that cell D, which is the main cell, is displayed at the center of the screen window in a large area in the sixth screen 70, whereas adjacent cells E and H are displayed in areas much smaller than that of cell D.

The present invention is not limited to the embodiments described herein and those skilled in the art may make various modifications and changes that fall within the sprit and scope of the invention defined by the appended claims. For example, a nine division screen display method in a 3×3 matrix was discussed in an embodiment of the present invention. However, according to a user's selection, the number of divided cells can be varied such that the area of the screen window is divided by a multiple of three, such as into twelve cells in a 3×4 or 4×3 matrix, fifteen cells in a 3×5 or 5×3 matrix, or eighteen cells in a 3×6 or 6×3 matrix. The divided cells are then displayed in an enlarged state conforming to the size of the screen.

Furthermore, in addition to dividing an area by a multiple of three, the number of divided cells can be varied such that the area of the screen window is divided by a multiple of two, such as into four cells in a 2×2 matrix, six cells in a 2×3 or 3×2 matrix, eight cells in a 2×4 or 4×2 matrix, ten cells in a 2×5 or 5×2 matrix, twelve cells in a 2×6 or 6×2 matrix, fourteen cells in a 2×7 or 7×2 matrix, or sixteen cells in a 2×8 or 8×2 matrix. The divided areas are then displayed in an enlarged state conforming to the size of the screen.

Furthermore, it is also possible that an area is divided into sixteen cells in a 4×4 matrix and the divided cells are displayed in an enlarged state conforming to the size of the screen. Additionally, relevant functions can be applied by setting a variety of division ratios in consideration of the resolution of a mobile communication terminal and the contents of a document.

Moreover, it is possible to implement a variety of embodiments for visually indicating which cell of entire divided cells is currently selected as the main cell in order to facilitate the screen division display function described in the embodiments of the present invention. For example, a thumbnail window may be displayed on the screen window by using a pop-up window scheme and a cell selected and displayed as the main cell may be displayed on the thumbnail window.

The thumbnail window may or may not be translucent. Alternatively, a translucent location information window that indicates which of a plurality of divided cells is the enlarged main cell may be displayed on the screen window in an overlay manner.

The location information window may be divided into a number of regions equal to the number of corresponding divided cells and a region corresponding to the main cell selected from among all the divided cells may be adjusted to be darker or brighter, thereby indicating which cell has been selected. Additionally, the location information window may be translucently displayed over the entire screen window or a portion of the screen window such that the contents of a cell displayed on the screen window are not obstructed.

Furthermore, when a certain key provided on the key input unit 170 is pressed, a light emitting diode (LED) installed under the corresponding key may be illuminated such that the pressed key can be identified, thereby associating the area of a cell displayed on the current screen window with keys provided on the key input unit. For example, if the key input unit 170 is provided with keys arranged in one-to-one correspondence with a plurality of cells constituting a page, the position of a cell displayed in an area of the screen window is indicated by means of illumination of a corresponding key. The keys may include ten numeric keys 0 to 9, the * key and # key, as well as additionally defined keys.

If the screen is divided into nine cells in a 3×3 matrix that has a one-to-one correspondence to a 3×4 key structure, nine cells may be displayed that are matched to numeric keys 1 to 9 provided on the key input unit 170. Therefore, a numeric key corresponding to a selected cell may be illuminated such that numeric key 1 is illuminated if cell 1 of the divided cells is selected and numeric key 2 is illuminated if cell 2 is selected.

Additionally, if the screen is divided into four cells in a 2×2 matrix, only numeric keys 1, 2, 4 and 5 among the numeric keys in a 3×4 matrix may be used such that numeric key 1 is illuminated if cell 1 is selected, numeric key 2 is illuminated if cell 2 is selected, numeric key 4 is illuminated if cell 3 is selected and numeric key 5 is illuminated if cell 4 is selected. Alternatively, if the screen is divided into four cells in a 2×2 matrix, only numeric keys 1, 2, 3 and 4 among the numeric keys in a 3×4 matrix may be used such that numeric key 1 is lit if cell 1 is selected, numeric key 2 is lit if cell 2 is selected, numeric key 3 is lit if cell 3 is selected, and numeric key 4 is illuminated if cell 4 is selected.

Similarly, if the screen is divided into six cells in a 2×3 or 3×2 matrix, only numeric keys 1, 2, 3, 4, 5 and 6 of the numeric keys in a 3×4 matrix may be used such that numeric key 1 is illuminated if cell 1 is selected, numeric key 2 is illuminated if cell 2 is selected, numeric key 3 is illuminated if cell 3 is selected, numeric key 4 is illuminated if cell 4 is selected, numeric key 5 is illuminated if cell 5 is selected and numeric key 6 is illuminated if cell 6 is selected. Alternatively, if the screen is divided into twelve cells in a 3×4 matrix that have a one-to-one correspondence to a 3×4 key structure including the numeric keys, * key and # key, the twelve cells may be indicated as matched to numeric keys 0 to 9, * key and # key.

Although the embodiments of the present invention have been discussed with respect to selecting a cell that is displayed on the screen window using the direction keys provided on the key input unit 170, various selection methods may be implemented that do not utilize the direction keys. For example, selection of the area of a cell displayed on the current screen window may be accomplished using keys provided on the key input unit 170 by illuminating an LED installed under the corresponding key so that the pressed key may be identified from the other keys.

If the screen is divided into nine cells in a 3×3 matrix that have a one-to-one correspondence to a 3×4 numeric key structure including the numeric keys provided on the key input unit 170, nine cells may be selected as matched to numeric keys 1 to 9. Therefore, a numeric key corresponding to a cell may be pressed to select the corresponding cell such that numeric key 1 is pressed to select cell 1 of the divided cells and numeric key 2 is pressed to select cell 2.

Additionally, if the screen is divided into four cells in a 2×2 matrix, only numeric keys 1, 2, 4 and 5 among the numeric keys in a 3×4 matrix may be used such that numeric key 1 is pressed to select cell 1, numeric key 2 is pressed to select cell 2*i*, numeric key 4 is pressed to select cell 3, and numeric key 5 is pressed to select cell 4. Alternatively if the screen is divided into four cells in a 2×2 matrix, only numeric keys 1, 2, 3 and 4 among the numeric keys in a 3×4 matrix may be used such that numeric key 1 is pressed to select cell 1, numeric key 2 is pressed to select cell 2, numeric key 3 is pressed to select cell 3, and numeric key 4 is pressed to select cell 4.

Similarly, if the screen is divided into six cells in a 2×3 or 3×2 matrix, only numeric keys 1, 2, 3, 4, 5 and 6 of the numeric keys in a 3×4 matrix may be used such that numeric key 1 is pressed to select cell 1, numeric key 2 is pressed to select cell 2, numeric key 3 is pressed to select cell 3, numeric key 4 is pressed to select cell 4, numeric key 5 is pressed to select cell 5, and numeric key 6 is pressed to select cell 6.

In this way, the display and selection of a divided cell of the screen in connection with the keys provided on the key input unit 170 may be simultaneously applied. Therefore, if a certain key is used to select a certain cell, the LED of the corresponding key is illuminated and the contents of the corresponding cell may be displayed in an enlarged state on the screen window.

Although the embodiments of the present invention have been described with respect to a document stored in the memory 110 that is displayed on the screen utilizing divided areas of the display unit 180, Web documents may also be displayed on the screen utilizing the divided areas.

According to the present invention, when a user views a variety of documents on an electronic terminal having a small LCD, such as a mobile communication terminal, each page of a document is divided into a plurality of cells, and a cell selected from among the divided cells is displayed in an enlarged state conforming to the size of a screen. Furthermore, a cell selected as the main cell is displayed in an enlarged state on the screen and the contents of cells adjacent to the enlarged main cell in left, right, upper left diagonal and lower right diagonal directions are provided in a minimum size Also according to the present invention, movement among these cells may be implemented by using up, down, left and right direction keys, such as navigation keys. Since movement among the divided cells can be easily implemented using the direction keys provided on the electronic terminal, the number of movements of a cursor required for displaying the entire document is drastically decreased even when a document is enlarged such that it may be recognized with the naked eye.

As the present invention may be embodied in several forms without departing from the spirit or essential characteristics thereof it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. An electronic terminal having a screen division display function, the terminal comprising:
   a memory adapted to store at least one document file; and
   a control unit adapted to select one of the at least one document file, divide a selected page of the selected document file into a plurality of cells having a grid configuration, process an input to select one of the plurality of cells and display the selected one of the plurality of cells in a first area of a screen window and display at least one unselected cell of the plurality of cells adjacent to the selected one of the plurality of cells in a second area of the screen window,
   wherein the selected one of the plurality of cells and the at least one unselected cell of the plurality of cells are displayed such that the grid configuration of the plurality of cells is converted into a vertical configuration for display,
   wherein the at least one unselected cell of the plurality of cells is adjacent to the selected one of the plurality of cells in one of a left, right, upper left diagonal and lower right diagonal direction of the grid configuration,
   wherein the unselected cell to the left of the selected cell is displayed in a closed condition and above the selected cell in the second area of the screen window,
   wherein the unselected cell to the right of the selected cell is displayed in a closed condition and below the selected cell in the second area of the screen window,
   wherein the unselected cell diagonally to the upper left of the selected cell is displayed in a closed condition and above the unselected cell to the left of the selected cell in the second area of the screen window, and
   wherein the unselected cell diagonally to the lower right of the selected cell is displayed in a closed condition and below the unselected cell to the right of the selected cell in the second area of the screen window.

2. The terminal of claim 1, wherein the control unit comprises:
   a division processing unit adapted to divide the selected page of the selected document file into the plurality of cells;
   a screen allocation processing unit adapted to allocate the selected one of the plurality of cells to the first area of the screen window and to allocate the at least one unselected cell of the plurality of cells to the second area of the screen window; and
   a screen display processing unit adapted to display the selected one of the plurality of cells in the first area of the screen window and display the at least one unselected cell of the plurality of cells in the second area of the screen window.

3. The terminal of claim 2, wherein the screen allocation processing unit is further adapted to display at least a portion of the contents of the at least one unselected cell of the plurality of cells in an overlay manner.

4. The terminal of claim 2, wherein the screen allocation processing unit is further adapted to entirely display the selected page of the selected document file on the screen window, the page comprising the plurality of cells.

5. The terminal of claim 4, wherein the screen allocation processing unit is further adapted to display the selected one of the plurality of cells in at least one of an enlarged state and a highlighted state in comparison to the at least one unselected cell of the plurality of cells.

6. The terminal of claim 4, wherein the second area is adjacent to the first area and the screen allocation processing unit is further adapted to:
display the contents of the selected one of the plurality of cells in a first size; and
display at least a portion of the contents of the at least one unselected cell of the plurality of cells in a second size smaller than the first size.

7. The terminal of claim 4, wherein the screen display processing unit is further adapted to display a thumbnail window in a predetermined area of the screen window, the thumbnail window indicating which of the plurality of cells comprising the page is the selected one of the plurality of cells displayed in the first area of the screen window.

8. The terminal of claim 4, wherein the screen display processing unit is further adapted to display a translucent location information window on the screen window in an overlay manner, the translucent location information window indicating which of the plurality of cells comprising the page is the selected one of the plurality of cells displayed in the first area of the screen window.

9. The terminal of claim 4, further comprising:
a key input unit having a plurality of keys arranged in one-to-one correspondence with the plurality of cells comprising the page and wherein the control unit is further adapted to indicate a location of the selected one of the plurality of cells displayed in the first area of the screen window by illuminating one of the plurality of keys.

10. The terminal of claim 4, further comprising:
a key input unit having a plurality of keys arranged in one-to-one correspondence with the plurality of cells comprising the page and wherein the control unit is further adapted to determine the selected one of the plurality of cells according to selection of one of the plurality of keys.

11. The terminal of claim 1, further comprising:
a key input unit having a direction key and wherein the control unit is further adapted to determine the selected one of the plurality of cells according to movement of the direction key.

12. The terminal of claim 1, further comprising:
a key input unit having a function key and wherein the control unit is further adapted to determine the selected one of the plurality of cells according to a function set by the function key.

13. A method for displaying a document on a screen window of an electronic terminal, the method comprising:
selecting a document file for display, the document file selected from among at least one stored document file;
dividing a page of the selected document file into a plurality of cells having a grid configuration;
receiving an input to select one of the plurality of cells;
displaying the selected one of the plurality of cells in a first area of the screen window; and
displaying at least one unselected cell of the plurality of cells adjacent to the selected one of the plurality of cells in a second area of the screen window,
wherein displaying the selected one of the plurality of cells and the at least one unselected cell of the plurality of cells comprises converting the grid configuration of the plurality of cells into a vertical configuration for display,
wherein the at least one unselected cell of the plurality of cells is a cell adjacent to the selected one of the plurality of cells in one of a left, right, upper left diagonal and lower right diagonal direction of the grid configuration,
wherein the unselected cell to the left of the selected cell is displayed in a closed condition and above the selected cell in the second area of the screen window,
wherein the unselected cell to the right of the selected cell is displayed in a closed condition and below the selected cell in the second area of the screen window,
wherein the unselected cell diagonally to the upper left of the selected cell is displayed in a closed condition and above the unselected cell to the left of the selected cell in the second area of the screen window, and
wherein the unselected cell diagonally to the lower right of the selected cell is displayed in a closed condition and below the unselected cell to the right of the selected cell in the second area of the screen window.

14. The method of claim 13, wherein displaying the at least one unselected cell of the plurality of cells comprises:
displaying at least a portion of the contents of the at least one unselected cell of the plurality of cells in an overlay manner.

15. The method of claim 13, further comprising:
entirely displaying the page of the selected document file on the screen window.

16. The method of claim 15, wherein displaying the selected one of the plurality of cells comprises:
displaying the selected one of the plurality of cells in at least one of an enlarged state and a highlighted state in comparison to the at least one unselected cell of the plurality of cells.

17. The method of claim 15, wherein the second area is adjacent to the first area and displaying the selected one of the plurality of cells comprises displaying the contents of the selected one of the plurality of cells in a first size and displaying the at least one unselected cell of the plurality of cells comprises displaying at least a portion of the contents of the at least one unselected cell of the plurality of cells in a second size smaller than the first size.

18. The method of claim 15, further comprising:
displaying a thumbnail window in a predetermined area of the screen window, the thumbnail window indicating which of the plurality of cells is the selected one of the plurality of cells displayed in the first area of the screen window.

19. The method of claim 15, further comprising:
displaying a translucent location information window on the screen window in an overlay manner, the translucent location information window indicating which of the plurality of cells is the selected one of the plurality of cells displayed in the first area of the screen window.

20. The method of claim 15, further comprising:
indicating a location of the selected one of the plurality of cells displayed in the first area of the screen window by illuminating one of a plurality of keys on a key input unit.

21. The method of claim 15, further comprising:
selecting the at least one of the plurality of cells according to selection of one of a plurality of keys on a key input unit.

22. The method of claim 13, further comprising:
selecting the at least one of the plurality of cells according to movement of a direction key on a key input unit.

23. The method of claim 13, further comprising:
selecting the at least one of the plurality of cells according to a function set by a function key on a key input unit.

* * * * *